UNITED STATES PATENT OFFICE.

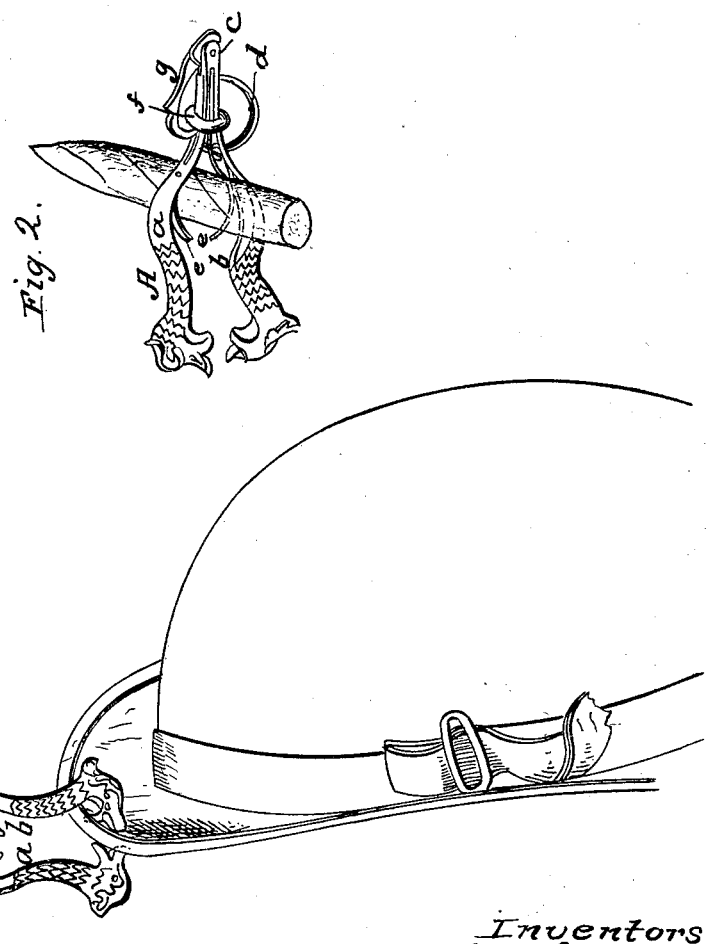

CHARLES GSCHWIND AND JOHN GRETHER, OF UNION HILL, NEW JERSEY.

CIGAR-HOLDER AND HAT-HOOK.

Specification forming part of Letters Patent No. 57,126, dated August 14, 1866.

*To all whom it may concern:*

Be it known that we, CHARLES GSCHWIND and JOHN GRETHER, of Union Hill, in the county of Hudson and State of New Jersey, have invented a new and Improved Cigar-Holder and Hat-Hook; and we do hereby declare that the following is a full, clear, and exact description thereof, which will enable others skilled in the art to make and use the same, reference being had to the accompanying drawings, forming part of this specification, in which—

Figure 1 represents a side elevation of this invention when used as a hat-hook. Fig. 2 is a perspective view of the same when used as a cigar-holder.

Similar letters of reference indicate like parts.

This invention relates to a simple device which can be conveniently carried in the pocket, and which can be used as a cigar-holder and also as a hat-hook, whereby the hat can be suspended in any convenient spot.

A represents our cigar-holder and hat-hook. It is composed of two jaws, $a$ $b$, which are hinged together by a pivot, $c$. On the shanks of said jaws slides a ring, $f$, so that the jaws can be conveniently opened or closed. The outer loose ends of the jaws $a$ $b$ serve to clamp a hat, as shown in Fig. 1, and the shanks of the jaws are curved and provided with springs $e$, which serve to hold a cigar, as shown in Fig. 2. A ring, $d$, forms the handle, and by passing a finger through this ring the cigar, after having been clamped in the holder, can be conveniently carried to the mouth.

With the jaws $a$ $b$ is connected a sharp-pointed hook, $g$, which turns on the pivot $c$, and which can be turned out to the position shown in Fig. 1, or down to the position shown in Fig. 2. When the hook is turned out it can be secured to a post or jamb or to any convenient spot in a room, and the hat can thus be suspended wherever a person may think best. When the hook is turned in its point drops in a cavity in one of the jaws, and if the ring $f$ is moved up, it catches over the point of the hook and retains the same, as shown in Fig. 2.

By these means an article is obtained which is very convenient, which can be easily carried in the pocket, and which serves the double purpose of a cigar-holder and of a hat-hook.

What we claim as new, and desire to secure by Letters Patent, is—

A device composed of two jaws, $a$ $b$, sliding ring $f$, springs $e$, and sharp-pointed hook $g$, all connected and operating substantially as and for the purpose set forth.

C. GSCHWIND.
JOHN GRETHER.

Witnesses:
WM. F. MCNAMARA,
ALEX. F. ROBERTS.